United States Patent
Kim et al.

(10) Patent No.: US 9,641,651 B2
(45) Date of Patent: May 2, 2017

(54) BACKWARD COMPATIBLE L-LTF DESIGN FOR IMPLEMENTATION FRIENDLY PREAMBLE

(71) Applicant: Apple Inc., Cupertino, CA (US)

(72) Inventors: Joonsuk Kim, Saratoga, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 14/630,691

(22) Filed: Feb. 25, 2015

(65) Prior Publication Data

US 2015/0257133 A1    Sep. 10, 2015

Related U.S. Application Data

(60) Provisional application No. 61/948,757, filed on Mar. 6, 2014.

(51) Int. Cl.
  *H04L 29/06* (2006.01)
  *H04L 5/00* (2006.01)
  *H04L 27/22* (2006.01)

(52) U.S. Cl.
  CPC ............ *H04L 69/22* (2013.01); *H04L 5/0048* (2013.01); *H04L 5/0053* (2013.01); *H04L 27/22* (2013.01)

(58) Field of Classification Search
  None
  See application file for complete search history.

(56) References Cited

U.S. PATENT DOCUMENTS

| | | | |
|---|---|---|---|
| 7,474,608 B2 | 1/2009 | Stephens et al. | |
| 8,072,980 B1 * | 12/2011 | Zhang | H04W 40/00 370/392 |
| 8,675,597 B2 | 3/2014 | Lee et al. | |
| 9,001,930 B2 | 4/2015 | Suh et al. | |
| 2008/0184087 A1 * | 7/2008 | Hayashi | H04L 1/1825 714/751 |
| 2010/0061493 A1 * | 3/2010 | Takahashi | H04L 7/042 375/343 |
| 2011/0170627 A1 * | 7/2011 | Kwon | H04L 25/0204 375/295 |
| 2013/0286961 A1 | 10/2013 | Vermani et al. | |
| 2014/0140357 A1 * | 5/2014 | Kenney | H04W 80/00 370/474 |

* cited by examiner

*Primary Examiner* — Kibrom T Hailu
(74) *Attorney, Agent, or Firm* — Meyertons Hood Kivlin Kowert & Goetzel, P.C.; Jeffrey C. Hood; Joel L. Stevens

(57) ABSTRACT

A backward compatible L-LTF design that can provide control information in addition to channel estimation information in conjunction with Wi-Fi communication techniques. A wireless transmission may be received by a wireless device. The wireless transmission may include a physical layer (PHY) preamble and PHY data. The PHY preamble may include a field that has a training sequence configured for channel estimation and control information. The control information may be determined by the wireless device, and the wireless device may configure reception parameters for the wireless transmission based on the control information.

20 Claims, 7 Drawing Sheets

| 6-11 | 12 | 1-2 | 1 | 2 | 2 |
|---|---|---|---|---|---|
| Partial DA 610 | Length 620 | MIMO 630 | Coding 640 | BW 650 | FFT 660 |
FIG. 6
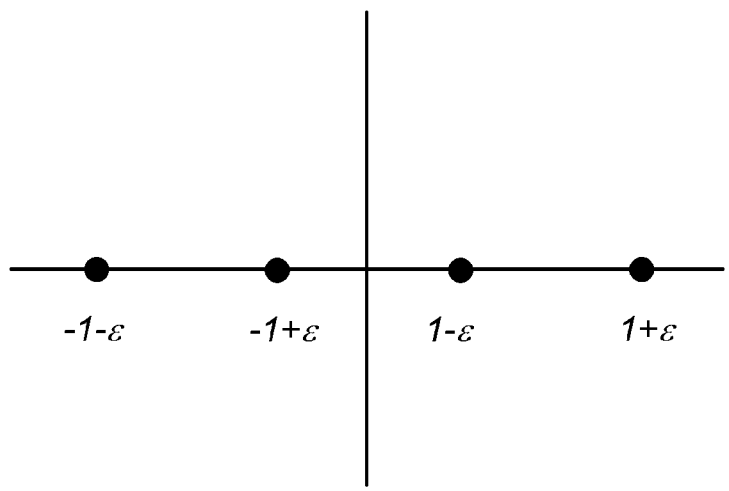
FIG. 7
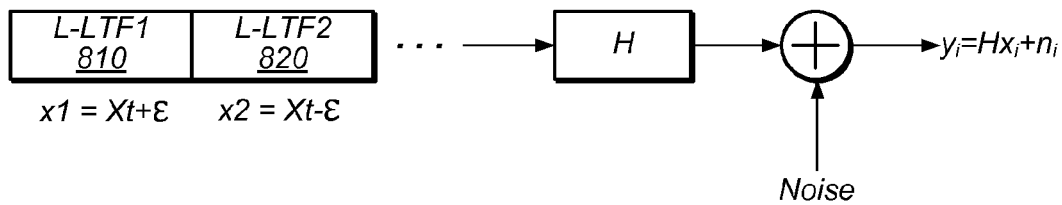
FIG. 8
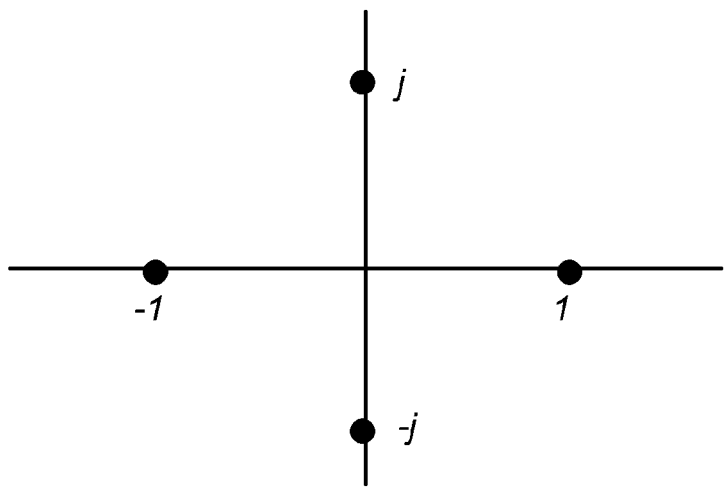
FIG. 9

--- Original L-LTF 1110
--- With BPSK at L-LTF 1120
··· With 90° Rotated BPSK at L-LTF 1130

BACKWARD COMPATIBLE L-LTF DESIGN FOR IMPLEMENTATION FRIENDLY PREAMBLE

PRIORITY CLAIM

The present application claims benefit of priority to U.S. Provisional Application No. 61/948,757 titled "Wi-Fi Low Energy Preamble using L-LTF Field" and filed on Mar. 6, 2014, which is hereby incorporated by reference in its entirety as though fully and completely set forth herein.

FIELD

The present disclosure relates to wireless communication, including to techniques for performing wireless communication with reduced power consumption and/or early indication of control information in systems such as IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Many devices that implement such wireless communication technologies are substantially mobile devices, which frequently rely on portable power supplies (e.g., batteries). For such devices in particular, as well as for other devices more generally, the power consumption considerations of implementing wireless communication technologies may be substantial. For example, battery life may influence consumer preference among possible wireless devices.

SUMMARY

This document describes, inter alia, methods for low-energy IEEE 802.11 (Wi-Fi) wireless communication, and describes wireless devices configured to implement the described methods.

Wi-Fi transmissions may generally be structured as having various physical layer (PHY) preamble fields, followed by PHY data, which may include encapsulated header information for higher layers and/or payload data.

Wi-Fi may utilize carrier sensing as a multiple access technology. In this case, a Wi-Fi device may monitor (sense) the Wi-Fi wireless medium for transmissions by Wi-Fi other devices at least some of the time, in order to determine if the medium is busy or free (e.g., if it has uplink data buffered and wants to use the medium for an uplink transmission) and/or to determine if any transmissions are directed to the device.

In order to conserve power, it may be desirable that upon sensing/detecting a transmission which is not directed to such a device, the device not spend any more time monitoring the medium than required to determine that the transmission is not intended for the device and the expected length of the transmission, and instead enter a low power (sleeping) state for the remainder of the transmission.

If a transmission is directed to a particular device, it may also be useful for that device to be provided with certain types of control information, for example for use in configuring the receive block(s) of the device according to the characteristics of the transmission, as soon as possible. For example, at least in some instances, earlier provision of such information may directly correspond to an increased timing budget for preparing components of the device to operate according to the specific parameters of the transmission.

According to the techniques described herein, it may be possible to provide destination, length, and/or various other control information early in the PHY preamble portion of a Wi-Fi transmission. This may reduce the amount of time required by a device to determine whether it is the intended recipient of a transmission, and to determine the scheduled duration of the transmission, and thus increase the amount of time in which the device may remain in a low power state, potentially reducing the power consumption of the device. This may also provide additional timing budget for operating receive blocks of a device which is the intended recipient of a transmission.

In particular, it may be possible to include control information for a Wi-Fi transmission as part of a portion of the PHY preamble configured for channel estimation.

For example, control information may be included in the L-LTF field of a Wi-Fi transmission. In this case, it may be possible to maintain backward compatibility, for example by adding BPSK signaling or 90 degree rotated BPSK signaling over the two L-LTF training sequences in such a manner that when added together the additional destination and length information is cancelled out and the training sequence for channel estimation is recovered, but when subtracted from one another the training sequence for channel estimation is cancelled and the additional destination and length information may be recovered.

The L-LTF may be used to provide early signaling of any of various types of control information by adding information on top of the LTF training sequence such as in the above-described manner. For example, the additional information may be formatted as an L-LTF control field which may be defined as containing subfields for any of various types of control information, such as any or all of packet destination, MIMO indication (e.g., how many RF chains), multi-user (MU) MIMO vs. single-user (SU) MIMO indication, coding indication (e.g., BCC or LDPC), bandwidth indication (e.g., 20/30/80/160), and/or FFT size indication (e.g., 64/128/256/512). This may assist a receiving device by providing early detection of the packet destination, providing sufficient timing budget to operate its receive block(s) according to the specified parameters, and/or preparing the device for hardware reuse (such as antenna chains).

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIGS. 5-12 illustrate exemplary implementation details of possible systems implementing aspects of the method of FIG. 4 in which control information is included in the L-LTF field of a Wi-Fi transmission, according to some embodiments.

Figure 1:
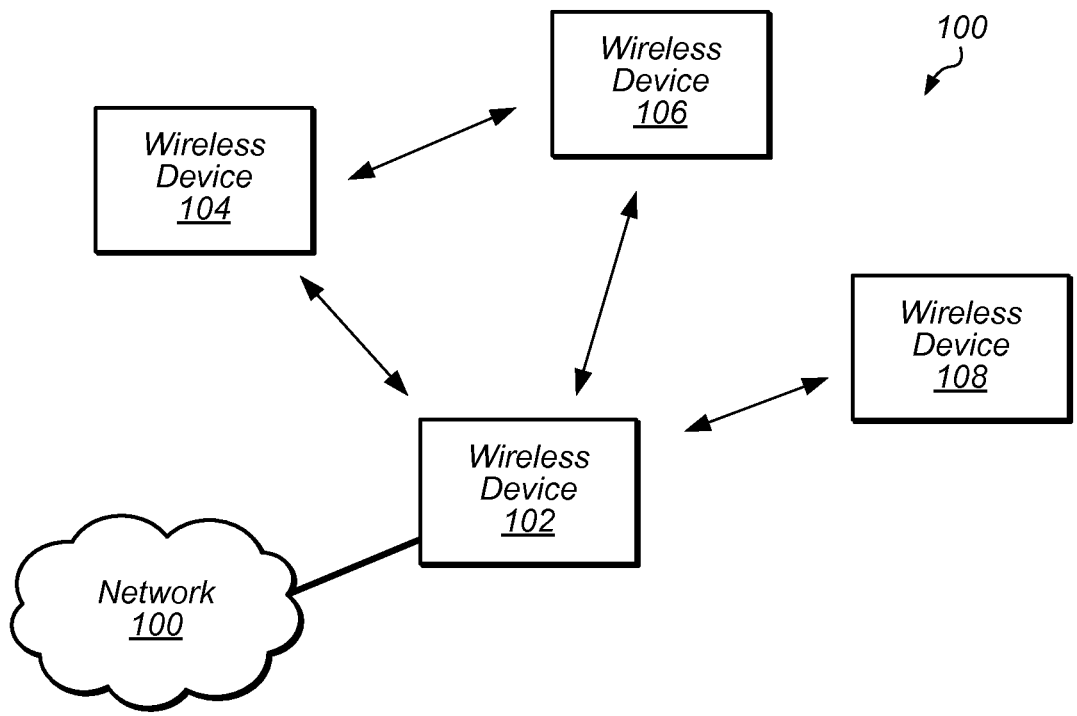
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
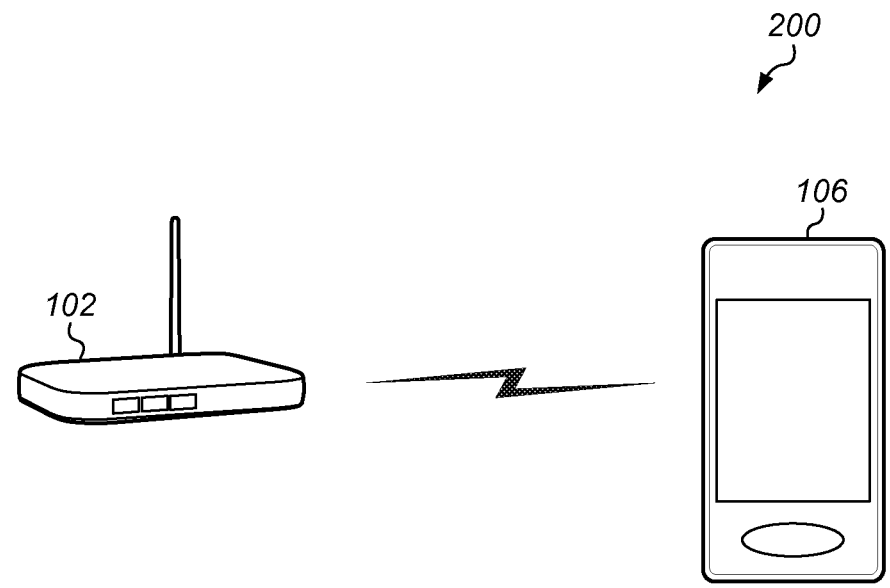

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform low energy IEEE 802.11 wireless communication according to aspects of the present disclosure.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of wireless devices 102-108 may be configured to perform any of the method embodiments described herein, or any portion of any of the method embodiments described herein, for example to include a control information field as part of a legacy long training field of a PHY preamble when communicating in the wireless communication system 100.

FIG. 2 illustrates an exemplary wireless communication system 200 in which aspects of the system 100 of FIG. 1 according to one possible implementation are represented, according to some embodiments. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a wearable device, a computer or a tablet, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
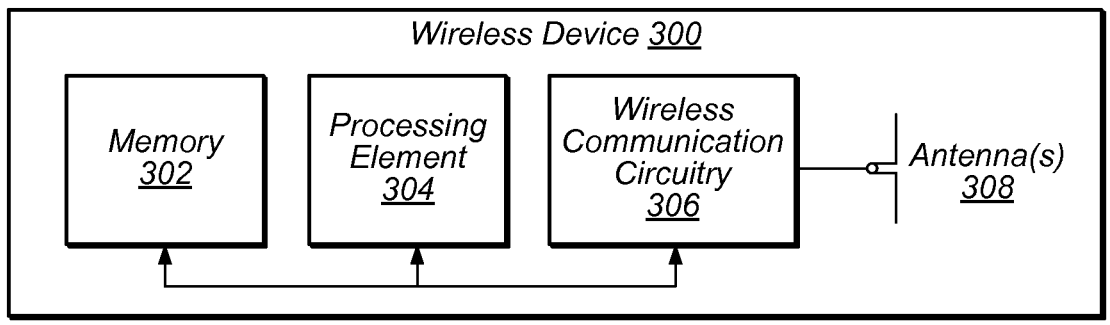
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300, which may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that, if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

Figure 4:
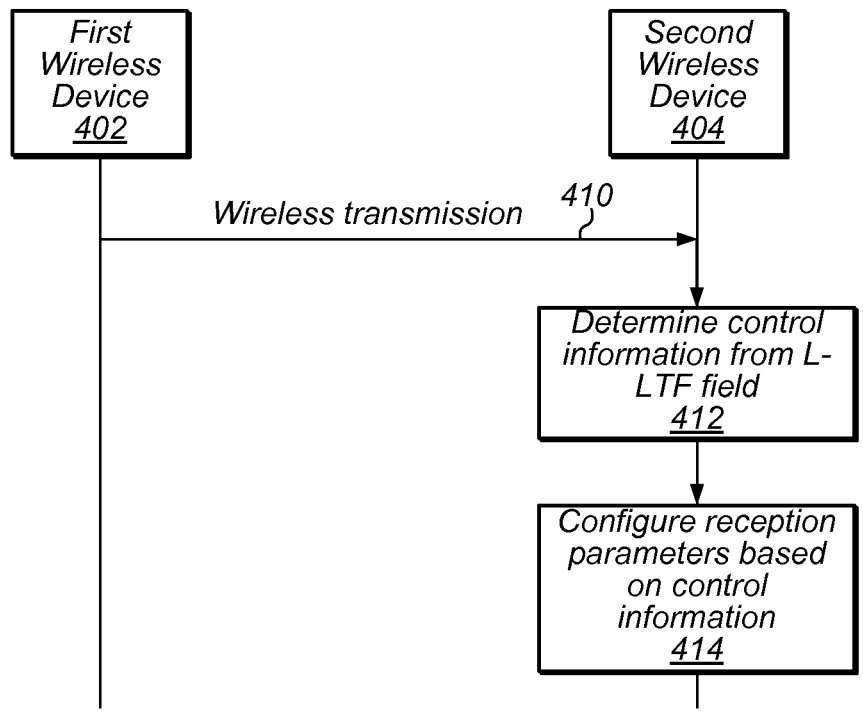
FIG. 4 is a signal flow diagram illustrating aspects of an exemplary method for wireless communication including an early indication of destination and length information, according to some embodiments.

As described herein, the device 300 may include hardware and software components for implementing features for performing low energy IEEE 802.11 wireless communication, such as those described herein with reference to, inter alia, FIG. 4.

FIG. 4—Communication Flow Diagrams

FIG. 4 is a communication/signal flow diagram illustrating a scheme that may be used for performing wireless communication in a wireless communication system, such as an IEEE 802.11 wireless communication system, according to some embodiments. The scheme may be used to provide early indication of control signaling/information by way of the L-LTF field of the PHY preamble. This may increase a device's receive operation efficiency, for example by providing additional timing budget for preparing the device to operate its receive block(s), e.g., when a packet is destined for the device.

The method shown in FIG. 4 may be used in conjunction with any of the computer systems or devices shown in the above Figures, among other devices. Some of the method elements shown may be performed concurrently, in a different order than shown, or may be omitted. Additional method elements may also be performed as desired. As shown, the methods may operate as follows.

A first wireless device 402 may perform a wireless transmission 410 (a "first wireless transmission"). The first wireless transmission may be performed according to any of a variety of wireless communication technologies and/or standards, as desired. As one specific possibility, the first wireless transmission may be an IEEE 802.11 (Wi-Fi) transmission.

The first wireless transmission 410 may include a physical layer (PHY) preamble and signaling information as well as PHY data. The PHY data may include encapsulated higher layer data for any of various possible networking, application, and/or other protocol stack layers, for example depending on the communication standard(s) and/or technologies in conjunction with which the first wireless transmission is being performed.

The PHY preamble and signaling information may facilitate carrier sensing and physical layer reception and decoding of the first wireless transmission by devices capable of receiving the first wireless transmission, and may include portions for any of various desired functions. For example, the PHY preamble and signaling information may include portions configured for any or all of signal/packet detection, gain control (e.g., automatic gain control (AGC)), coarse and/or fine frequency offset estimation and correction, coarse and/or fine timing estimation, channel estimation, modulation scheme and/or coding rate information, transmission length, transmission destination(s), and/or any of various other information. In particular, in the exemplary case in which the first wireless transmission 410 is a Wi-Fi transmission, the PHY preamble may include any or all of a legacy short training field (L-STF), a legacy long training field (L-LTF), a legacy signal field (L-SIG), one or more 'high throughput' (HT) and/or 'very high throughput' (VHT) short training fields, long training fields, and/or signal fields, depending on the version (e.g., 802.11n, 802.11ac, etc.) of the Wi-Fi transmission.

As shown, at least a portion of the first wireless transmission 410 may be received by a second wireless device

404. In 412, the second wireless device 404 may determine control information for the first wireless transmission 410 from the L-LTF field. The control information may include any of various possible types of information, according to various embodiments. As one possibility, the L-LTF field may include control information indicating a destination and length of the first wireless transmission 410. As further (additional or alternative) possibilities, the L-LTF field may include control signals indicating receiver operating parameters for use with the first wireless transmission 410, such as any or all of MIMO indication(s) (e.g., how many RF chains to use, and/or whether single-user-(SU-) or multi-user-(MU-) MIMO is used), coding indication(s) (e.g., which type of coding, such as binary convolutional coding (BCC) or low-density parity-check (LDPC) coding is used), bandwidth indication (e.g., how much bandwidth is used for the first wireless transmission 410), Fast Fourier Transform (FFT) size indication (e.g., the size of the FFT block used for the first wireless transmission 410), and/or any of various other possible types of control information for the first wireless transmission 410.

The control information may be overlaid on the channel estimation training sequence of the L-LTF field. For example, additional BPSK modulation may be performed on top of the training sequence by performing BPSK modulation on top of the BPSK training sequence, adding 90 degree rotated BPSK signaling onto the BPSK training sequence, etc. Correspondingly, the control information may be determined by the second wireless device 404 from the L-LTF field in any of various ways, e.g., depending on how the L-LTF field is configured.

Based on the control information received in 412, the second wireless device 404 may (if it is the intended destination of the first wireless transmission 410) configure itself for reception of the first wireless transmission 410. This may include adjusting receiver hardware in accordance with the signaled parameters of the first wireless transmission 410, for example by readying the appropriate number of antenna chains, selecting a MIMO mode, adapting bandwidth and/or FFT size, and switching to the appropriate coding block. By receiving such control information as part of the L-LTF field, the second wireless device 404 may be provided with a substantially larger timing budget for configuring its various components for proper operation than if such information were included in later signaling fields, which may substantially improve efficiency and/or enable higher throughput communication between the first wireless device 402 and the second wireless device 404 (and potentially between other devices in their wireless communication system).

Note that if the second wireless device 404 is not the intended destination of the first wireless transmission 410 (e.g., as may also be determined from the control information determined from the L-LTF, if destination information is included in the L-LTF), the second wireless device 404 may also be able to drop the remainder of the first wireless transmission, and may thereby obtain power saving benefits.

FIGS. 5-12—Exemplary 802.11 Implementation Details

FIGS. 5-12 and the information provided herein below in conjunction therewith are provided by way of example of various considerations and details relating to possible IEEE 802.11 wireless communication systems in which the method of FIG. 4 may be implemented, according to some embodiments, and are not intended to be limiting to the disclosure as a whole. Numerous variations and alternatives to the details provided herein below are possible and should be considered within the scope of the disclosure.

In Wi-Fi communication systems, significant power savings are achieved by allowing Wi-Fi devices (e.g., STAs) to sleep as much as possible. For example, one possible power save (PS) mode of operation may include a STA waking up at specific intervals (e.g., delivery traffic indication message (DTIM) intervals) to 'listen' to transmissions from the access point. If there is traffic buffered at the AP for the STA, the STA would then remain awake until the AP has sent all of the buffered data to the STA; otherwise, the STA may sleep until the next specified interval and check again for buffered traffic.

However, depending on the loading of the cell, the STA may be forced to wait a greater or lesser amount of time before the AP transmits its data (e.g., due to the carrier sense multiple access/collision avoidance (CSMA/CA) nature of the protocol and time-sharing of the medium). In the meantime, the STA may listen to (at least a portion of) every transmission on the medium, since it may not know when it's packet will arrive.

Figure 5:
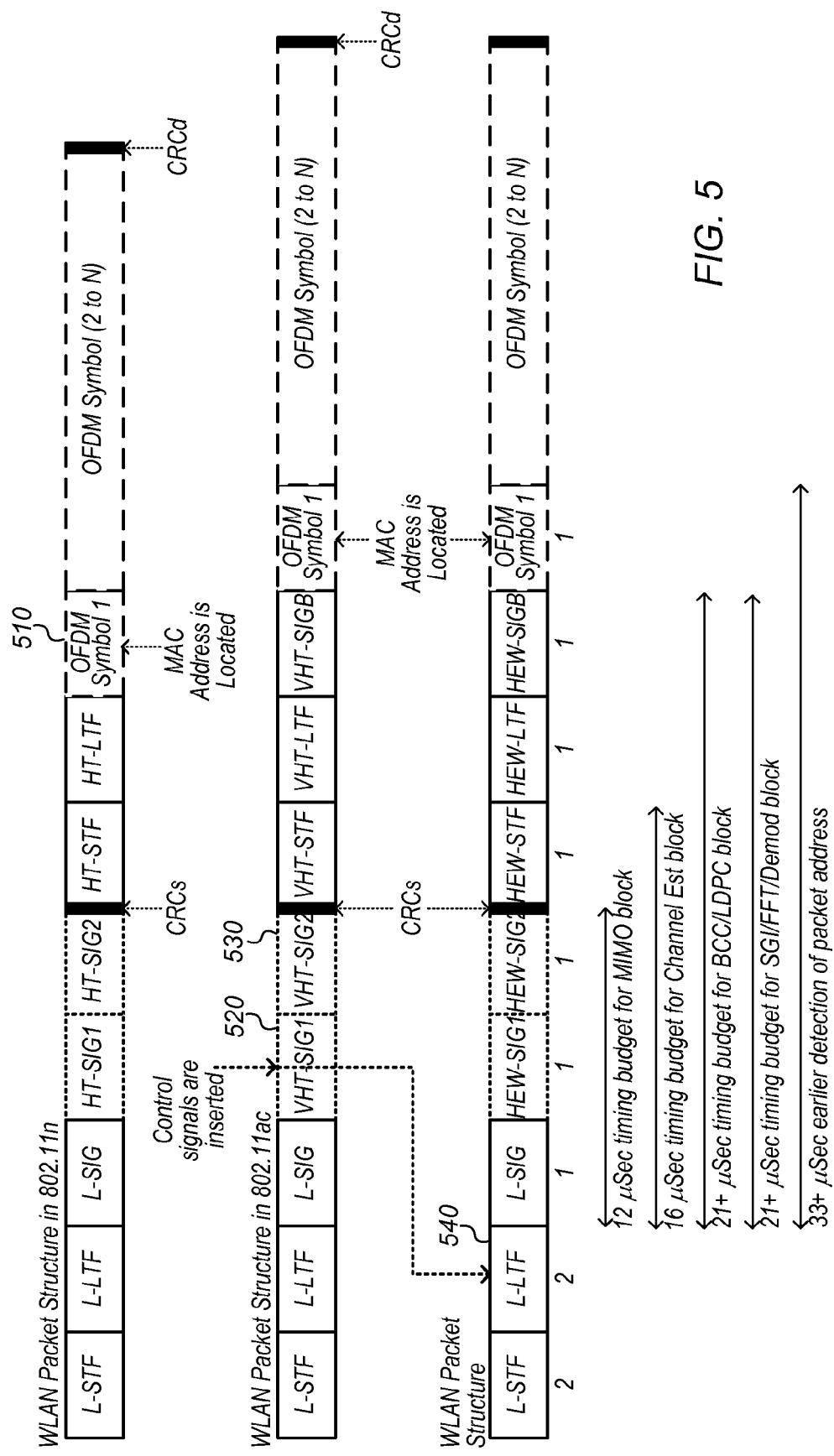

If provided with destination and length information for a packet, it may be possible for a STA to listen to only a portion of a packet, determine that the packet is not intended for the STA, and drop the remainder of the packet and sleep until the next transmission, which may reduce the power consumption of the STA during such periods while waiting for a transmission. This may include setting a network allocation vector (NAV) to enable "virtual carrier sensing". Greater power consumption reduction may be achieved with earlier inclusion of the information needed for such a capability. As described with respect to FIG. 4, it may further more generally be possible to provide any of a variety of types of control information early in an IEEE 802.11 packet, by including such information in a modified (but potentially backwards-compatible) version of the L-LTF field. FIG. 5 illustrates possible packet structures according to different versions of IEEE 802.11 in which various types of control information are included at different locations in the packet.

As shown in FIG. 5, for 802.11n packets, destination information (MAC address of the destination device) is not included until the first OFDM symbol 510 of the PHY data. In the WLAN packet structure transition from 802.11n to 802.11ac, certain control information may be inserted in the VHT-SIG1 field 520 of 802.11ac which replaces the HT-SIG1 field of 802.11n; for example, destination information (in particular, a partial association ID or PAID) for the packet may be provided in the VHT SIG-A1 field 520, and may be decoded and used to determine the destination of the packet after the VHT SIG-A2 field 530.

In the exemplary subsequent transition illustrated in FIG. 5, control information may be included even earlier in the packet, in particular as part of the L-LTF field 540. Including control information at such an early location in the packet may provide an increased timing budget for the blocks for which control information is provided relative to the locations in which such information might otherwise be provided. For example, as shown, including control information in the L-LTF 540 may provide 12-33 µs or more of additional timing budget to various possible blocks of the receiver relative to certain potential alternate locations for such control information. It should of course be noted that these exemplary timing budget increase values are provided by way of example only, and that any number of alternate timing budget increase values are also possible.

The format of the control information included in the L-LTF field 540 may be designed as desired; for example, any of various fields/subfields (having any of a variety of possible lengths and formats) may be defined and used for the control information. As one exemplary possibility, the format illustrated in FIG. 6 may be used, if desired.

As shown, the illustrated exemplary L-LTF control field may include a destination subfield 610 that may include a partial destination address, such as the MAC address or AID address (or a portion, such as the lower portion, of the MAC address or AID of the destination device). This exemplary subfield may include 6-11 bits of information; more bits assigned may reduce false detection probability, but also requires that the mechanism (e.g., coding scheme) selected for providing the additional control information be capable of providing a greater number of bits of information.

Additionally, the L-LTF control field may include a length subfield 620 that may include a length value of the packet in OFDM symbols, bytes, µs, or any other metric. As one possibility, the length subfield may include 12 bits of information; greater or lesser numbers of bits (e.g., with corresponding greater or lesser maximum field values) are also possible.

The L-LTF control field may also include a MIMO subfield 630, which may include an indication of for how many RF chains the transmission is configured. As one possibility, the length subfield may include 1-2 bits of information, for example for indicating whether 1, 2, 3, or 4 RF chains are configured; greater or lesser numbers of bits (e.g., if a different number of MIMO configurations are possible) are also possible.

Further, the L-LTF control field may include a coding subfield 640, which may include an indication of which of multiple possible types of coding are used for the transmission. As one possibility, the coding subfield may include 1 bit of information, for example for indicating whether BCC or LDPC coding is used; greater or lesser numbers of bits (e.g., if a different number of coding schemes are possible) are also possible.

Still further, the L-LTF control field may include a bandwidth subfield 650, which may include an indication of which of multiple possible transmission bandwidths are used for the transmission. As one possibility, the BW subfield may include 2 bits of information, for example for indicating whether 20, 40, 80, or 160 MHz bandwidth are used for the transmission; greater or lesser numbers of bits (e.g., if a different number of bandwidths may be used) are also possible.

Additionally, the L-LTF control field may include an FFT subfield 660, which may include an indication of which of multiple possible FFT block sizes are used for the transmission. As one possibility, the FFT subfield may include 2 bits of information, for example for indicating whether a 64, 128, 256, or 512 point FFT block is used for the transmission; greater or lesser numbers of bits (e.g., if a different number of FFT sizes may be used) are also possible.

Thus, for the exemplary L-LTF control field of FIG. 6, 24-30 information bits may be used for control signals. Note that if additional control signals are desired, it may be possible (e.g., depending on the coding scheme used for the L-LTF) to also include them. For example, though not shown, it may also be possible to include any or all of a MU-MIMO indication, a cyclic redundancy check, and/or any of various other subfields in addition to or as alternatives to those subfields shown in FIG. 6, as desired.

At least in some instances, it may be possible to add such information to the L-LTF without breaking backward compatibility. In other words, if designed to be backward compatible, legacy devices (e.g., which may not be able to obtain the control information from the L-LTF) may still be able use the L-LTF field to perform channel estimation and timing synchronization.

More particularly, the original L-LTF field includes a known sequence of +1 s and −1 s over 52 tones, repeated over two OFDM symbols. The inner 48 tones may be used for channel estimation, e.g., in order to decode the L-SIG and subsequent fields. If ½ rate coded, there may be 24 information bits available; if ¾ rate coded, there may be 36 information bits available; if differentially encoded, there may be 47 information bits available. The repeated known sequence may generate two correlation peaks, which may be used to time-synchronize OFDM symbol detection. The two OFDM symbols of the L-LTF may be summed before performing channel estimation, which may result in, e.g., a 3 dB noise reduction gain.

FIGS. 7-9 illustrate possible techniques for including additional information in the L-LTF field in a manner that does not break backward compatibility.

FIG. 7 is a constellation diagram illustrating an example technique for adding BPSK signaling on top of the existing L-LTF BPSK training sequence. The resulting constellation diagram appears similar to a 2 bit pulse amplitude modulation (4 PAM) scheme; however, since one of the bits is effectively determined by the known training sequence, such a scheme may effectively add 48 coded bits to the L-LTF. Note that all points may be scaled for unity power; the value of $\epsilon$ may be selected as desired; as an example, it is illustrated in FIG. 7 as $\epsilon=\frac{1}{2}$.

As previously noted, channel estimation at each tone may be performed by adding the two L-LTF OFDM symbols (which may alternatively be referred to as L-LTF sub-fields). If the two L-LTF sub fields are formulated such as illustrated in FIG. 8 (i.e., where L-LTF1 810 has x1=Xt+$\epsilon$ while L-LTF2 820 has x2=Xt−$\epsilon$), the additional information may be cancelled out to obtain the (estimated, e.g., due to noise, as denoted by the hat) training sequence term H at each tone:

$$\hat{H}=(y_1+y_2)/2 \times X_t^* = H+n,$$

where the noise power n is −(SNR+3)dB,
$|X_t|^2=1$, and
( )* denotes complex conjugate.

Thus, legacy devices performing channel estimation by summing the two L-LTF subfields 810, 820 may still be able to detect the known training sequence.

On the other hand, the additional information at each tone may be detected by subtraction of the two L-LTF subfields 810, 820. For this calculation, the original training sequence terms, $X_t$, may be cancelled out, and only additional information $\epsilon$ may remain (with some noise):

$$\hat{\epsilon}=(y_1-y_2)/2=\epsilon+n,$$

where the noise power n is −(SNR+3)dB.

FIG. 9 is a constellation diagram illustrating an example technique for adding 90-degree rotated BPSK signaling over the existing L-LTF BPSK training sequence. In this case, the real parts of the constellation (i.e., +1 or −1) may be used for the original (known) training sequence, while the imaginary parts of the constellation (i.e., +j or −j) may provide the additional information bits.

Figure 10:
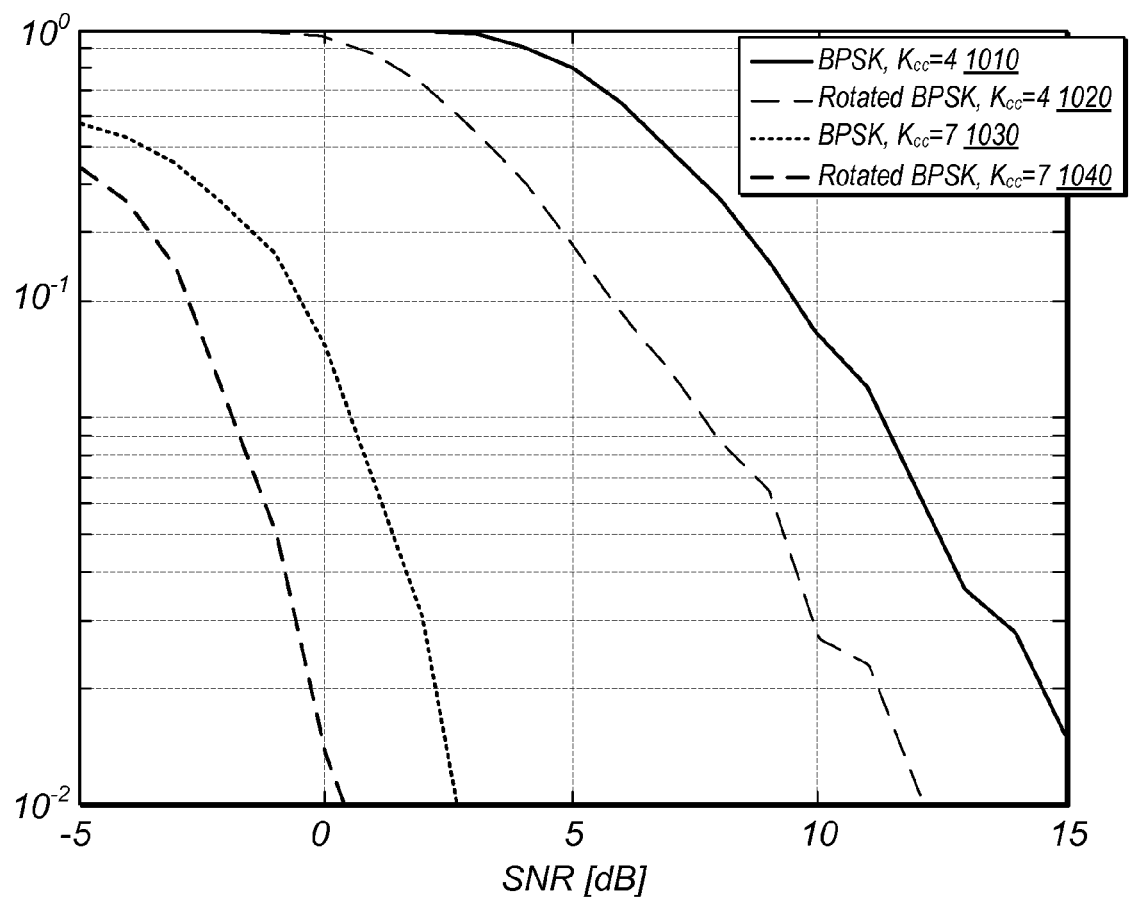
Figure 11B:
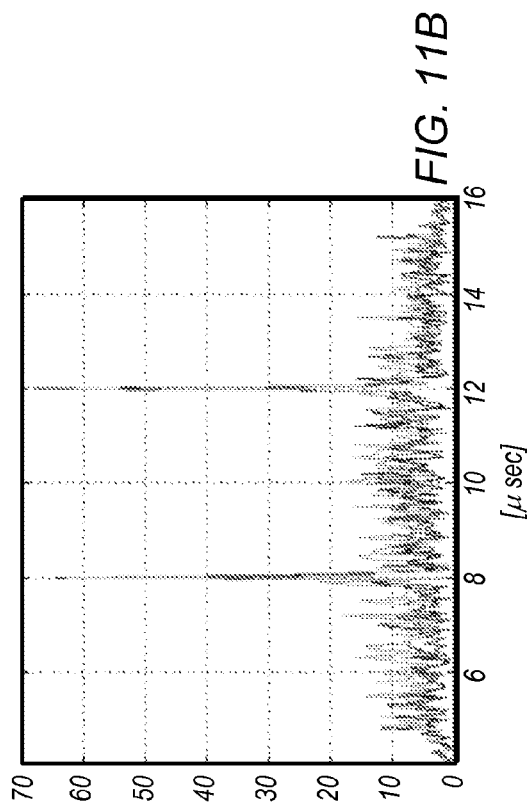
Figure 11D:
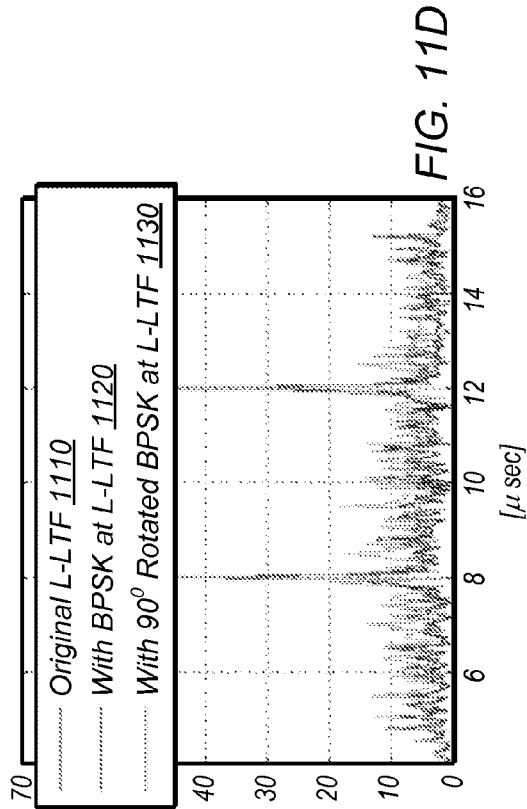
Figure 11A:
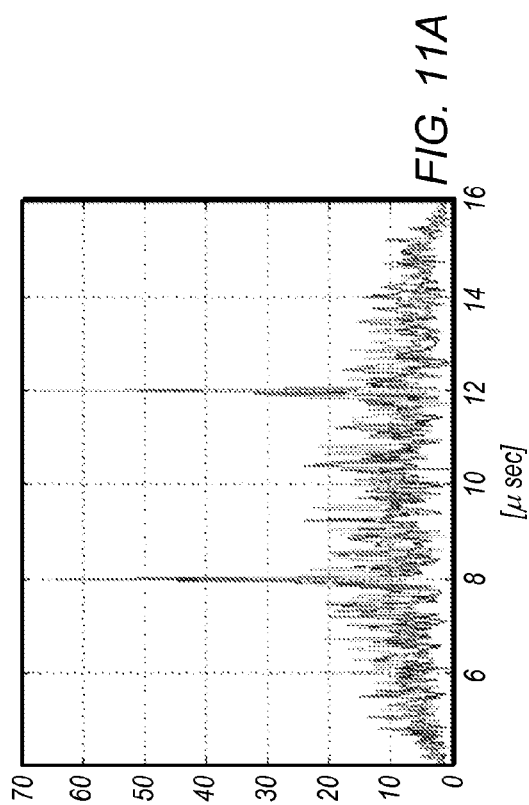
Figure 11C:
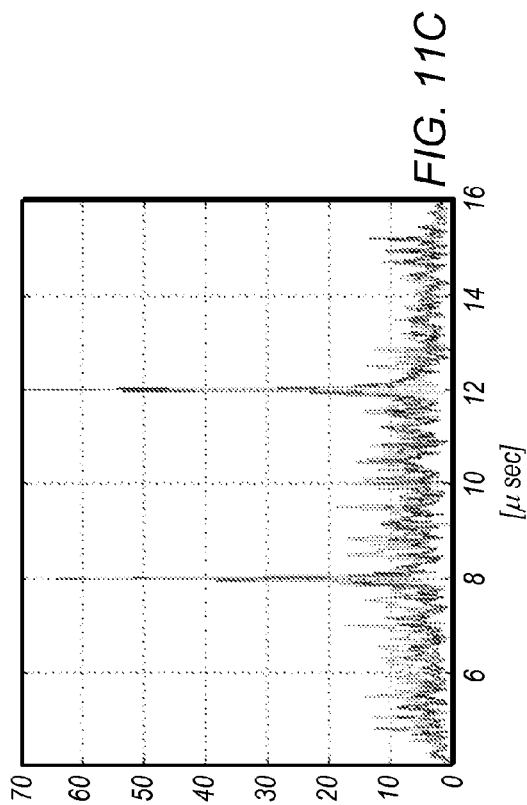
Figure 12:
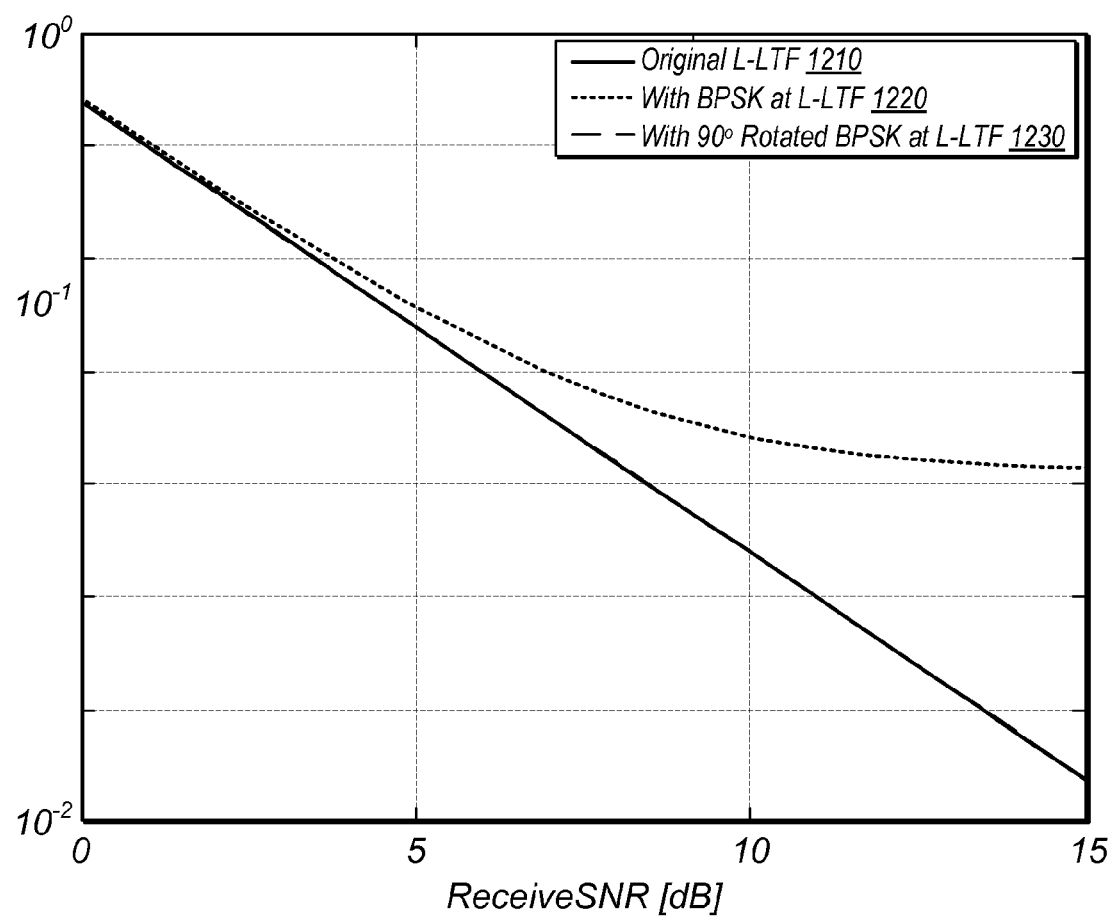

FIGS. 10-12 are graphs illustrating various test results for the schemes for including additional information illustrated in FIGS. 7-9.

FIG. 10 illustrates example packet error rate (PER) performance for the schemes with different constraint lengths for a fading channel. As shown, both schemes (overlaid BPSK 1010, 1030 and rotated BPSK 1020, 1040) show good performance, in particular with constraint length of 7 (Kcc=7). It may be noted that the overlaid BPSK schemes 1010, 1030 show a 3 dB penalty relative to the rotated BPSK schemes 1020, 1040, e.g., due to a shortened free distance $d_{free}$.

FIGS. 11A-11D illustrate timing synchronization correction (sampling timing offset/STO) results for the original L-LTF process 1110, for the added BPSK process 1120, and for the added 90-degree rotated BPSK process 1130, at different signal levels. In particular, FIG. 11A illustrates cross correlation at 0 dB, FIG. 11B illustrates cross correlation at 2 dB, FIG. 11C illustrates cross correlation at 4 dB, and FIG. 11D illustrates cross correlation at 6 dB. As can be seen, performance is very similar between the different processes. The added 90-degree rotated BPSK 1130 appears to show a slight decrease in performance (higher noise floor), but the difference appears to be marginal.

FIG. 12 illustrates example channel estimation performance for the original L-LTF process 1210, for the added BPSK process 1220, and for the added 90-degree rotated BPSK process 1230. In particular, channel estimation accuracy in terms of mean square error (MSE) in dB is illustrated as a function of receive signal to noise ratio (SNR) in dB. While the added 90-degree rotated BPSK scheme 1230 shows similar performance to the original L-LTF scheme 1210, as shown, the added BPSK scheme 1220 shows an error floor, which may result from the unit energy scale of the 4 PAM constellation. It may be possible to improve (e.g., reduce) the error floor for the added BPSK scheme 1220 by reducing the value of $\epsilon$, however, this may result in degradation of the PER for that scheme.

Thus, by adding control information to the L-LTF field using BPSK or 90-degree rotated BPSK over the top of the existing BPSK training sequence, it may be possible for a device configured to recognize such information to begin preparing its components for reception according to the specific parameters of a packet at an earlier stage of the packet for which it is the intended recipient, or alternatively to perform early dropping of packets for which the device is not the intended recipient, thereby realizing power savings. Furthermore, both legacy device and new devices may be able to utilize the L-LTF field for channel estimation and timing synchronization as originally intended using such schemes.

In the following further exemplary embodiments of the disclosure are presented.

1. A method, comprising: receiving, by a wireless device, a wireless transmission, wherein the wireless transmission comprises a physical layer (PHY) preamble and PHY data; wherein the PHY preamble comprises destination information indicating a destination and length information indicating a length of the wireless transmission, wherein the PHY preamble comprises a portion configured for channel estimation; wherein the destination information and the length information are comprised in the portion of the PHY preamble configured for channel estimation; determining, by the wireless device, whether the wireless transmission is intended for the wireless device based on the destination information; and dropping, by the wireless device, the remainder of the first wireless transmission if the destination information indicates that the wireless transmission is not destined to the wireless device.

2. The method of example 1, wherein the destination information and the length information are encoded by adding BPSK signaling carrying the destination information and the length information onto a BPSK training sequence, wherein the added BPSK signaling is added by: adding BPSK signaling on top of the BPSK training sequence; or adding 90 degree rotated BPSK signaling onto the BPSK training sequence.

3. The method of any of examples 1-2, wherein the wireless transmission is an IEEE 802.11 wireless communication; wherein the PHY preamble comprises at least a legacy short training field and a legacy long training field; wherein the destination information and the length information are part of the legacy long training field.

4. The method of any of examples 1-3, wherein dropping, by the wireless device, the remainder of the wireless transmission comprises sleeping or entering a low power state for the length of the wireless transmission based on the length information.

5. A method, comprising: performing, by a first wireless device, a first wireless transmission, wherein the first wireless transmission comprises a physical layer (PHY) preamble and PHY data, wherein the PHY preamble comprises destination information indicating a device to which the first wireless transmission is destined and length information indicating a length of the first wireless transmission, wherein the PHY preamble comprises a portion configured for channel estimation, wherein the destination information and the length information are comprised in the portion of the PHY preamble configured for channel estimation; receiving, by a second wireless device, at least a portion of the first wireless transmission; and if the destination information indicates that the first wireless transmission is not destined to the second wireless device: determining by the second wireless device, that the first wireless transmission is not intended for the second wireless device based on the destination information; and dropping, by the second wireless device, the remainder of the first wireless transmission.

6. The method of example 5, wherein the destination information and the length information are encoded by adding BPSK signaling carrying the destination information and the length information onto a BPSK training sequence, wherein the added BPSK signaling is added by: adding BPSK signaling on top of the BPSK training sequence; or adding 90 degree rotated BPSK signaling onto the BPSK training sequence.

7. The method of any of examples 5-6, wherein the first wireless transmission is an IEEE 802.11 wireless communication, wherein the PHY preamble comprises at least a legacy short training field and a legacy long training field, wherein the destination information and the length information are as part of the legacy long training field.

8. The method of any of examples 5-7, wherein dropping, by the second wireless device, the remainder of the first wireless transmission comprises sleeping or entering a low power state for the length of the first wireless transmission based on the length information.

9. A method, comprising: by a wireless device: receiving a wireless transmission, wherein the wireless transmission comprises a physical layer (PHY) preamble and PHY data, wherein the PHY preamble comprises a legacy long training field (L-LTF), wherein the L-LTF comprises control information for the wireless transmission; determining the control information from the L-LTF field; and configuring reception parameters for the wireless transmission based on the control information.

10. The method of example 9, wherein the L-LTF comprises a BPSK training sequence configured for channel estimation, wherein the control information is encoded by adding BPSK signaling over the BPSK training sequence.

11. The method of example 10, wherein the control information is encoded by adding BPSK signaling on top of the BPSK training sequence.

12. The method of example 10, wherein the control information is encoded by adding 90 degree rotated BPSK signaling onto the BPSK training sequence.

13. The method of any of examples 9-12, wherein the control information comprises destination and length information for the wireless transmission.

14. The method of any of examples 9-13, wherein the control information comprises MIMO configuration information for the wireless transmission.

15. The method of any of examples 9-14, wherein the control information comprises an indication of whether the wireless transmission uses multi-user MIMO or single-user MIMO.

16. The method of any of examples 9-15, wherein the control information comprises an indication of a coding type used for the wireless transmission.

17. The method of any of examples 9-16, wherein the control information comprises an indication of a bandwidth of the wireless transmission.

18. The method of any of examples 9-17, wherein the control information comprises an indication of a size of a Fast Fourier Transform block used for the wireless transmission.

19. A method, comprising: by a first wireless device: generating a signal for wireless transmission, wherein the signal comprises a physical layer (PHY) preamble and PHY data, wherein a field of the PHY preamble comprises a training sequence configured for channel estimation by the wireless device, wherein the field further comprises control information configured to provide reception parameters for the wireless transmission; and wirelessly transmitting the signal.

20. The method of example 19, wherein signal is an IEEE 802.11 wireless communication signal, wherein the field comprises a legacy long training field (L-LTF) of the PHY preamble of the IEEE 802.11 wireless communication signal.

21. The method of any of examples 19-20, wherein the control information is encoded by adding BPSK signaling carrying the destination information and the length information onto a BPSK training sequence, wherein the added BPSK signaling is added by: adding BPSK signaling on top of the BPSK training sequence; or adding 90 degree rotated BPSK signaling onto the BPSK training sequence.

22. The method of any of examples 19-21, wherein the control information comprises destination information indicating a device to which the wireless transmission is intended and length information indicating a length of the wireless transmission.

23. The method of example 22, wherein the destination information and the length information are configured for use by wireless devices to which the wireless transmission is not destined to determine to drop a remainder of the wireless transmission.

24. The method of any of examples 19-23, wherein the control information comprises at least one of: an indication of a MIMO configuration for reception of the wireless transmission; an indication of whether to use SU-MIMO or MU-MIMO; an indication of a coding type used for the wireless transmission; an indication of a bandwidth of the wireless transmission; or an indication of a Fast Fourier Transform (FFT) block size used for the wireless transmission.

25. A wireless device, comprising: an antenna; a processing element operably coupled to the antenna; wherein the processing element and the antenna are configured to implement any or all parts of any of the methods of examples 1-24 above.

26. A wireless user equipment (UE) device, comprising: one or more radios, coupled to one or more antennas configured for wireless communication; and an processing element operably coupled to the one or more radios; wherein the UE is configured to implement any or all parts of any of the methods of examples 1-24 above.

27. A non-transitory computer accessible memory medium comprising program instructions which, when executed at a device, cause the device to implement any or all parts of any of the methods of examples 1-24 above.

28. A computer program comprising instructions for performing any or all parts of any of the methods of examples 1-24 above.

29. An apparatus comprising means for performing any or all of the method elements of any of examples 1-24 above.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. A method, comprising:
by a wireless device:
receiving a wireless transmission, wherein the wireless transmission comprises a physical layer (PHY) preamble and PHY data, wherein the PHY preamble comprises a legacy long training field (L-LTF), wherein the L-LTF comprises channel estimation information and control information for the wireless transmission, wherein the control information is encoded in the channel estimation information in a manner to allow for backwards compatibility with devices unable to decode the control information;

performing channel estimation using the channel estimation information from the L-LTF;

determining the control information from the L-LTF field, wherein said determining the control information from the L-LTF field comprises decoding the control information from the channel estimation information; and configuring reception parameters for the wireless transmission based on the control information.

2. The method of claim 1, wherein the L-LTF comprises a binary phase shift keying (BPSK) training sequence configured for channel estimation, wherein the control information is encoded by adding BPSK signaling over the BPSK training sequence.

3. The method of claim 2, wherein the control information is encoded by adding BPSK signaling on top of the BPSK training sequence.

4. The method of claim 2, wherein the control information is encoded by adding 90 degree rotated BPSK signaling onto the BPSK training sequence.

5. The method of claim 1, wherein the control information comprises destination and length information for the wireless transmission.

6. The method of claim 1, wherein the control information comprises multiple input and multiple output (MIMO) configuration information for the wireless transmission.

7. The method of claim 1, wherein the control information comprises an indication of whether the wireless transmission uses multi-user multiple input and multiple output (MIMO) or single-user MIMO.

8. The method of claim 1, wherein the control information comprises an indication of a coding type used for the wireless transmission.

9. The method of claim 1, wherein the control information comprises an indication of a bandwidth of the wireless transmission.

10. The method of claim 1, wherein the control information comprises an indication of a size of a Fast Fourier Transform block used for the wireless transmission.

11. A wireless device, comprising:
an antenna; and
a processing element coupled to the antenna;
wherein the processing element and the antenna are configured to:
receive a wireless transmission, wherein the wireless transmission comprises a physical layer (PHY) preamble and PHY data, wherein the PHY preamble comprises a field comprising a training sequence configured for channel estimation by the wireless device, wherein the field further comprises control information for the wireless transmission, wherein the control information is encoded in the training sequence in a manner that is backwards compatible;
perform channel estimation using the training sequence;
decode the control information from the training sequence;
configure reception parameters for the wireless transmission based on the control information; and
receive a remainder of the wireless transmission according to the configured reception parameters.

12. The wireless device of claim 11, wherein the field is an IEEE 802.11 legacy long training field (L-LTF) field.

13. The wireless device of claim 11, wherein the training sequence comprises a binary phase shift keying (BPSK) modulated training sequence, wherein the control information is encoded by adding BPSK signaling carrying destination information and length information onto the BPSK modulated training sequence,
wherein the added BPSK signaling is added by:
adding BPSK signaling on top of the BPSK training sequence; or
adding 90 degree rotated BPSK signaling onto the BPSK training sequence.

14. The wireless device of claim 11, wherein the control information comprises at least one of:
destination information for the wireless transmission;
length information for the wireless transmission;
multiple input and multiple output (MIMO) configuration information for the wireless transmission;
coding configuration information for the wireless transmission;
bandwidth configuration information for the wireless transmission; or
FFT size configuration information for the wireless transmission.

15. An apparatus, comprising:
one or more processing elements, wherein the one or more processing elements are configured to implement:
generating a signal for wireless transmission to a wireless device, wherein the signal comprises a physical layer (PHY) preamble and PHY data, wherein a field of the PHY preamble comprises a training sequence configured for channel estimation by the wireless device, wherein the field further comprises control information configured to provide reception parameters for the wireless transmission, wherein the control information is encoded in the training sequence, wherein the field is configured to be backward compatible such that the training sequence configured for channel estimation is usable by devices not configured to use the control information; and
wirelessly transmitting the signal.

16. The apparatus of claim 15,
wherein signal is an IEEE 802.11 wireless communication signal, wherein the field comprises a legacy long training field (L-LTF) of the PHY preamble of the IEEE 802.11 wireless communication signal.

17. The apparatus of claim 15,
wherein the control information is encoded by adding binary phase shift keying (BPSK) signaling carrying destination information and length information onto a BPSK training sequence,
wherein the added BPSK signaling is added by:
adding BPSK signaling on top of the BPSK training sequence; or
adding 90 degree rotated BPSK signaling onto the BPSK training sequence.

18. The apparatus of claim 15,
wherein the control information comprises destination information indicating a device to which the wireless transmission is intended and length information indicating a length of the wireless transmission,
wherein the destination information and the length information are configured for use by wireless devices to which the wireless transmission is not destined to determine to drop a remainder of the wireless transmission.

19. The apparatus of claim 15, wherein the control information comprises at least one of:
an indication of a multiple input and multiple output (MIMO) configuration for reception of the wireless transmission;

an indication of whether to use single user (SU)-MIMO or multi-user (MU)-MIMO;

an indication of a coding type used for the wireless transmission;

an indication of a bandwidth of the wireless transmission; or an indication of a Fast Fourier Transform (FFT) block size used for the wireless transmission.

20. The apparatus of claim 15, wherein the training sequence comprises a binary phase shift keying (BPSK) training sequence, wherein the control information is encoded by adding BPSK signaling over the BPSK training sequence.

* * * * *